United States Patent Office 3,380,213
Patented Apr. 30, 1968

3,380,213
UPGRADING WOOD PANELS
Seymour Hartman, Mahopac, and Frederick G. Snook, Pawling, N.Y., assignors to U.S. Plywood-Champion Papers Inc., a corporation of New York
Filed Oct. 8, 1964, Ser. No. 402,637
11 Claims. (Cl. 52—309)

The present invention is broadly concerned with the upgrading of wood panels or plies and is more specifically directed toward the upgrading of cores and veneers utilized in the manufacture of high quality plywood panels. In accordance with the present invention, the core and/or the respective veneers are treated in order to fill knot holes, voids, splits and other defective areas and thus render the respective elements very adaptable for the production of high quality plywood panels. The materials used for the treatment of the ply or plies comprise a polyurethane foam and modifications and adaptations of the same.

In the plywood art as, for example, when using Douglas fir, it is known to upgrade the fir by various techniques. One method, for example, is to remove or punch out the knots and insert "wooden boat patches" either in a single veneer ply or in the face plies of a pressed plywood panel, and to glue these patches to the veneer or veneers. In these techniques it is essential that the inserted patch blend in with the grain of the wood, and have excellent adhesion to the wood veneer so that it will not become loose or become detached during subsequent processing operations. It has now been discovered that wood plies, when used in combination with polyurethane foam, produce an improved structural element or ply which can be used to produce high quality plywood panels. The polyurethane as it foams readily fills in the irregular voids, splits, knotholes and other defective areas, thereby greatly enhancing the value of the upgraded ply. These foams have excellent adhesion to the wood fibers and will not become loose or detached. These foams are heat stable, and possess excellent glue properties for affixing one veneer to another, such as affixing a face veneer to a core ply.

Referring to the drawings.

Figure 1:
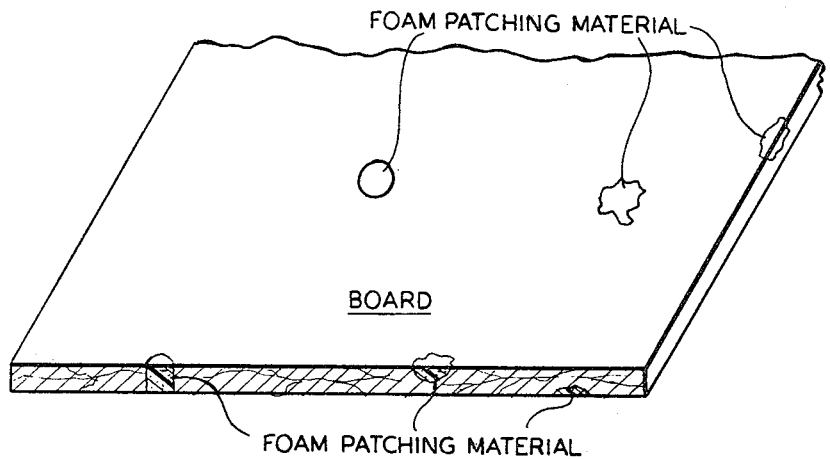
FIG. 1 illustrates a board or single veneer with patching material therein.
Figure 2:
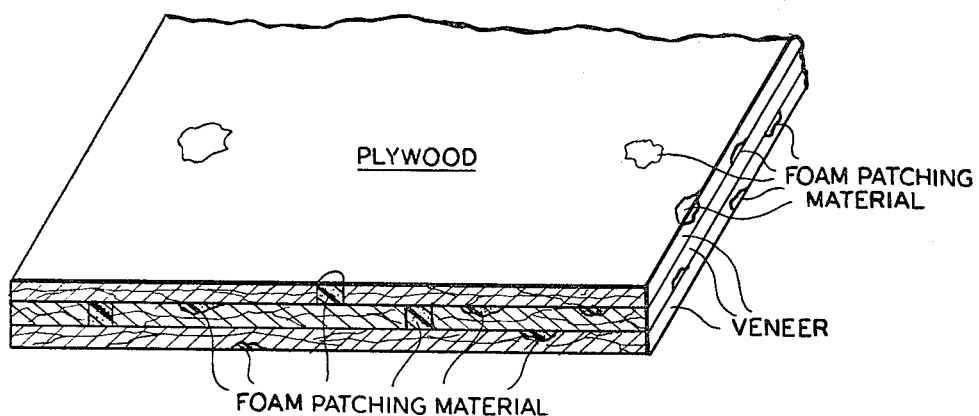
FIG. 2 shows a plywood panel with patching therein.

In general, polyurethane foam is prepared from two main basic ingredients as, for example, an organic polyisocyanate and a poly-hydroxy-functional material, such as a polyester or polyether. These two basic materials are generally first pre-reacted with an excess of isocyanate 80% to 20% polyester to provide a liquid material designated as the "prepolymer" containing terminal-NCO-groupings. The foam may also be made by using these constituents in the unreacted state, by the so-called "one-shot" technique.

The preferred polyisocyanate employed in preparing the liquid intermediate reaction product or prepolymer is toluene diisocyanate. Other diisocyanates, such as ethylene diisocyanate, hexamethylene diisocyanate and tetramethylene diisocyanate may be used. Alkylene diisocyanates such as propylene-1,2-diisocyanate; cycloalkylene diisocyanate such as 1,4-diisocyanateocyclohexane, as well as aromatic diisocyanate such as m- and p-phenylene diisocyanate, p,p'-diphenyl diisocyanate and 1,5-naphthalene diisocyanate may also be used.

The poly-hydroxy-functional material, or polymer with which the polyisocyanate is reacted to provide the liquid prepolymer can be a polyester made from a glycol, for example, ethylene glycol or a mixture of glycols, and an aliphatic saturated dicarboxylic acid, for example, adipic acid, using an excess of glycol over the acid so that the resulting polyester contains hydroxyl groups. Such polyester may be linear, or it may be branched, the latter effect being achieved by including in the preparation a poly-hydroxy-component containing 3 or more hydroxy groups, such as, trimethylolpropane.

Examples of polyethers and polyols which may be used are poly (oxypropylene) ethers of glycerol, trimethylol propane, 1,2,6 hexanol, sorbitol and pentaerythritol, etc.

When the polyesters and a diisocyanate are brought together, especially in the presence of water, an extremely rapid reaction takes place with the generation of much exothermic heat, and with the liberation of carbon dioxide. Under appropriate conditions, the carbon dioxide can be entrapped in the mass to form foamed polyurethane resins of high cellularity and valuable for use as an insulating material. The use of Freon as a blowing agent can also be used instead of water.

Thus, polyesters suitable for the present invention are prepared by reacting a dibasic acid and a dihydric or polyhydric alcohol. The polyester component to form a rigid foam should possess a relatively high hydroxy value in the range from 280 to 500, such as about 375, and a low acid number in the range from about 0.5 to 2.5, such as about 1.5. As mentioned, suitable dibasic acids for use in preparing these polyesters include succinic acid, adipic acid, sebacic acid and phthalic anhydride and others containing up to about 10 carbon atoms. Mixtures of two or more acids may be employed. A mixture of adipic acid and phthalic anhydride is preferred.

The dihydric alcohol components of the polyester are propylene glycol, ethylene glycol, diethylene glycol and others. The polyhydric alcohols employed to form this polyester should contain at least 3 hydroxy groups such as glycerol, pentaerythritol; trimethylolpropane and the like, since they afford rigid thermosetting resins when reacted with diisocyanates. It is desirable that the prepared polyester resin possess a high hydroxy number and a low acid value since this allows more reactive sites for the diisocyanate and ultimately yields a more rigid foam. A polyester with a hydroxy number range of about 300 to about 500 is preferred.

The esterification reactions employed in the preparation of the polyester comprises heating the mixture, preferably under azeotropic conditions (to assist in carrying away the water of reactions) at a temperature range of about 250° F. to 450° F. The reaction is carried out until the product has a very low acid value and a high hydroxy number.

The present invention may be more fully understood by the following examples illustrating the same:

Example 1

A suitable polyester was prepared from the following components:

| | Mols |
|---|---|
| Trimethylolpropane | 9 |
| Adipic acid | 5 |
| Phthalic anhydride | 1 |

The mixture was cooked to an acid number of about 1 and a hydroxy value of about 435.

The prepolymer was prepared from the polyester using tolylene diisocyanate. In the making of the product all of the tolylene diisocyanate and a portion of the polyester are reacted to give a product with a free isocyanate content of about 25 to 35%. This will reduce the toxicity of the materials by binding up 65–75% of free isocyanate.

In preparing the rigid polyurethane foam, the polyester is initially mixed with an emulsifying agent. A catalyst and the predetermined amount water are then added to give the desired end foam density. The diisocyanate component is then added and mixing continued for a short time. Suitable catalysts to produce a cured polyurethane foam are, for example, tertiary amines; (triethylamine, dimethylethanolamine, etc.). Conventional emulsifying agents are usually employed. These are sold commercially and comprise Triton X–100 (alkyl phenol and ethylene oxide), Tween–40 (polyoxyethylene sorbitan monopalmitate ethylene oxide reaction product), and/or silicones, X–521 (Union Carbide), etc.

In practicing the invention, the polyurethane foam may be applied within the hole, crack, etc. as a "boat patch," but is preferably applied by "in-situ" production methods.

Example 2

A one-quarter inch sheet of polyurethane foam prepared as described was cut to form boat patches. These polyurethane boat patches were then set into a top or face wood veneer. The density of the one-quarter inch polyurethane foam sheet was about 3.4 lbs./ft.$^3$. Glue was then coated on the core wood material or wood ply and the face veneer with the polyurethane foam boat patch placed on top of the core ply. Another wood face veneer was placed on the back of the core ply. After pressing at a pressure of about 150 lbs./sq. in. and at a temperature of about 250° F., the product was removed. The foamed boat polyurethane patch looked excellent. The panel was cooled and the polyurethane foam patch sanded. Adhesion of the polyurethane foam to the wood veneer was very excellent at all points of contact.

Example 3

A polyurethane foam system was prepared as described from a polyester having an hydroxy number of 430, a diisocyanate adduct component possessing 32% free NCO group, an emulsifying agent; a catalyst (dimethylethanol amine) and enough water to yield a density of 2 lbs./cu. ft. The polyester, emulsifying agent, catalyst and water were blended together until a well homogeneous mix developed. To this was added a predetermined amount of the diisocyanate adduct and the entire mixture was mixed well. The amount of diisocyanate added is dependent upon the density desired; and is also a function of the free isocyanate which is available to react with the hydroxy groups of the polyester.

Portions of this foam composite were placed in the knotholes, voids, splits and/or other defective areas of the plywood assembly. The panel was placed in a press for 5 minutes at 280° F. at 100 p.s.i. The panel upon being removed from the press was found to be upgraded to an extent which permitted its use as a good substrate for lamination or other use for which a sound veneer is required to produce a high quality product.

Example 4

In other tests portions of this foam composite as described were placed in the knotholes, voids, splits and other defective areas of the veneers in a three ply assembly. In this operation, the foam composite can be placed in the defective areas of the defective veneers of a three or more ply assembly after the glue is spread on the core and as the top and bottom veneers are placed in position to be pressed. Then the entire set-up can be put under pressure for 2 minutes to 24 hours either with or without heat. Thus, in one operation the press is utilized to make a finished panel with all the voids and defects filled.

The pressure may vary about 50 to 225 p.s.i. and temperatures up to 450° F. may be used. Thus, a press may be utilized to both cure up a panel system as well as to aid in confining the polyurethane foam to the voids in the defective veneers, thereby producing a void-free panel through expansion of the foam into defective areas. This secures an excellent bond between all elements.

Example 5

In other tests, fillers were incorporated into the basic foam formulation to obtain the desirable characteristics compatible with wood; such as shrinking and swelling, adhesion to subsequent coatings and coloration. Range of filler additive incorporated can be from about 10 to 60 phr. (parts by weight per hundred parts of resin) with an optimum range of 25 to 40 phr. such as about 30 phr. Desirable compositions are:

|  | Weight Percent | Weight Percent Range |
|---|---|---|
| Polyester resin | 52.5 | 40–60 |
| Silicone* | .525 | .2–.8 |
| H$_2$O | 1.65 | .5–3.0 |
| Dimethylethanolamine | .0525 | .01–.09 |
| Wood Flour | 30 | 20–30 |
| Isocyanate adduct | 75 | 50–90 |

*Silicone X–521—Union Carbide's product.

The above formulation produced a foam which provides some swelling when soaked in water as well as some shrinkage when dried. This characteristic is desirable when used in conjunction with cellulosic materials such as wood flour, sawdust, etc. Other satisfactory fillers are, for example, walnut shell flour, bark flour, cellulosic fibers, asbestos, and silica. The preferred and optimum mesh size of 50–325 mesh produces startling, unobvious results.

While the density of the polyurethane may vary appreciably, it is preferred that it be in the range from about 6 to 12 lbs./ft.$^3$, such as about 9 lbs./ft.$^3$. This provides better compression resistance and hardness as well as less porosity.

What is claimed is:

1. Process for manufacturing a multi-ply board, wherein at least one ply contains a void defect, which comprises positioning polyurethane foamable material in said defect, affixing the respective plies one to the other by means of glue, thereafter subjecting the glued plies to pressure whereby a multi-ply product of high quality results.

2. Process as defined by claim 1 wherein said polyurethane foam is formed in said defect.

3. Process as defined by claim 2 wherein said polyurethane foam is formed under conditions to produce a foam having a density in the range from about 6 to 12 lbs. per cubic foot.

4. A plywood panel which comprises a core, a face ply and a rear ply, both face and rear plies bonded to said core, at least one of said plies characterized by having a void defect containing rigidly affixed in said void a polyurethane foam, said plies being bonded together and said polyurethane foam being secured in position by the adhesive nature of the foam when subjected to a pressure of 50–225 p.s.i., and a temperature from about 250° F. to 450° F.

5. A plywood board as defined by claim 4, wherein said foam has a density in the range from about 6 to 12 lbs./ft.$^3$.

6. A plywood board as defined by claim 4 wherein said foam is a reaction product between trimethylolpropane, adipic acid and toluene diisocyanate.

7. A plywood board as defined by claim 4, wherein said foam contains from about 10 to 60 parts by weight of filler per 100 parts by weight of resin.

8. A plywood board as defined by claim 7, wherein said filler is cellulose material.

9. Process for manufacturing a multi-ply board wherein at least one ply contains a void defect which comprises positioning polyurethane foamable material in said defect, affixing the respective plies one to the other by means of glue, thereafter subjecting the glued plies to pressure whereby a multi-ply product of high quality results, wherein pressure applied is in the range from about 50 to 225 p.s.i. and wherein the multi-ply board is subjected to a temperature in the range from about 250° F. to 450° F.

10. Process for manufacturing a multi-ply board wherein at least one ply contains a void defect which comprises positioning polyurethane foamable material in said defect, affixing the respective plies one to the other by means of glue, thereafter subjecting the glued plies to pressure whereby a multi-ply product of high quality results, and wherein pressure applied is in the range from about 50 to 225 p.s.i.

11. Process for manufacturing a board containing a void defect which comprises positioning polyurethane foamable material in said defect, wherein pressure applied is in the range from about 50 to 225 p.s.i., and wherein the board is subjected to a temperature in the range from about 250° F. to 450° F.

References Cited

UNITED STATES PATENTS

| | | | |
|---|---|---|---|
| 2,565,251 | 8/1951 | Malmstrom. | |
| 3,242,239 | 3/1966 | Schafer | 264—36 |
| 2,674,770 | 4/1954 | Bennett | 52—514 |
| 2,888,359 | 5/1959 | Jorgensen | 117—2 |
| 3,211,674 | 10/1965 | Sandridge | 117—161 |

OTHER REFERENCES

Modern Plastics, December 1958, page 94.

JOHN E. MURTAGH, *Primary Examiner.*